Mar. 27, 1923. 1,450,096.
T. J. McCAFFREY.
INNER TUBE.
FILED DEC. 13, 1920.
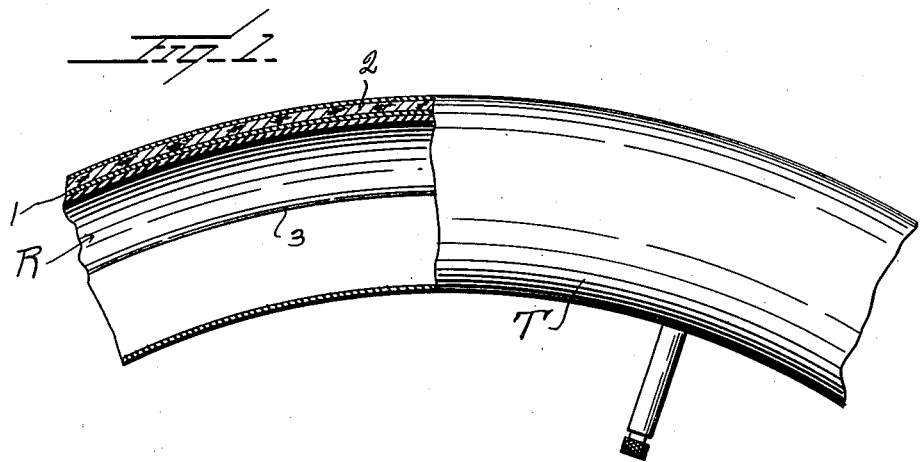
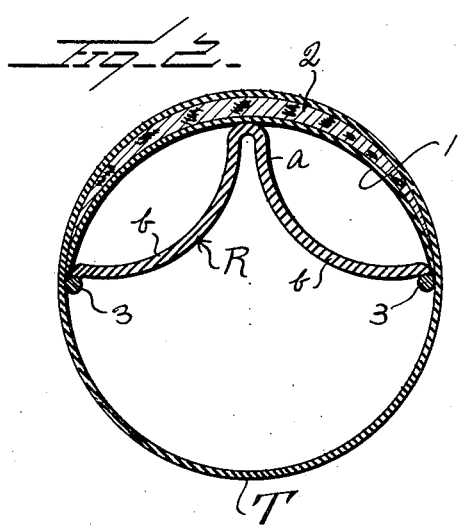 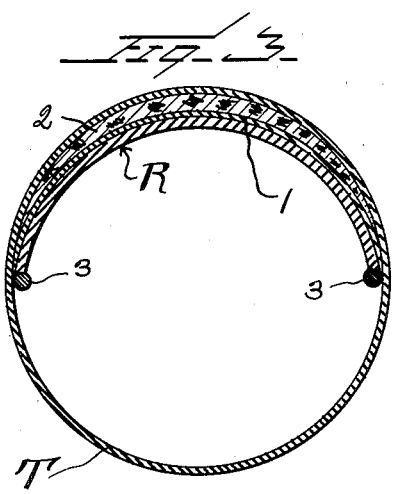
Inventor
T. J. McCaffrey
By Watson E. Coleman
Attorney

Patented Mar. 27, 1923.

1,450,096

UNITED STATES PATENT OFFICE.

THOMAS J. McCAFFREY, OF SEATTLE, WASHINGTON.

INNER TUBE.

Application filed December 13, 1920. Serial No. 430,374.

*To all whom it may concern:*

Be it known that I, THOMAS J. MCCAFFREY, a citizen of the United States, residing at Seattle, in the county of King and State of Washington, have invented certain new and useful Improvements in Inner Tubes, of which the following is a specification, reference being had to the accompanying drawings.

This invention relates to certain improvements in inner tubes for pneumatic tires or other inflatable bodies, and it is an object of the invention to provide a device of this general character with novel and improved means whereby loss of inflation or pressure as a result of puncture is substantially eliminated.

Another object of the invention is to provide an inflatable body having arranged therein a strip or member compressible under pressure so that said member will automatically operate or expand to close an opening produced therethrough by puncture.

The invention consists in the details of construction and in the combination and arrangement of the several parts of my improved inner tube whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in side elevation and partly in section illustrating an inner tube constructed in accordance with an embodiment of my invention.

Figure 2 is an enlarged transverse sectional view taken through a tube constructed in accordance with an embodiment of my invention with the inserted member in its initial or relaxed condition, and Figure 3 is a view similar to Figure 2 with the inserted member under compression.

As disclosed in the accompanying drawings, T denotes an inner tube provided at its tread portion with a circumferentially disposed partition 1 preferably of rubber and spaced from the tread portion of the tube T proper. Arranged within the chamber afforded between the partition 1 and the tread portion of the tube T proper is a filler 2 of fibrous material and particularly cork.

Secured by vulcanization or otherwise to the inner face of the tube T and substantially centrally of the side faces of said tube or at the connected marginal portions of the partitions 1 are the strands 3 of rubber or other material and which strands provide circumferentially disposed abutting members, said strands or abutments being continuous.

R denotes a continuous sheet of relatively soft rubber or rubber composition initially molded into the cross sectional configuration as is particularly illustrated in Figure 2 of the accompanying drawings. In cross section, the sheet R at its transverse center is substantially V-shaped, as at $a$, while each of the side marginal portions $b$ is concavo-convex in cross section with the convex face inwardly disposed.

In the production of the tube T, the sheet R is arranged in said tube and the initial transverse diameter of the sheet R is such whereby the side marginal portions of the sheets R contact or engage with the strands or abutments 3 while the intermediate or apex portion of said sheet R has contact with the tread portion of said tube at substantially the transverse center thereof.

When the tube T is inflated, the side inbows or marginal portions $b$ are forced outwardly by the inflation or pressure, resulting in the outer face of said sheet R snugly contacting at all points with the tread portion of the tube T between the strands or abutments 3. This action also results in the sheet R being compressed within itself to such an extent that in the event of a puncture through the tread portion of the tube T, the resultant opening, upon release of the puncturing element, will instantantly close by the expansion of the sheets R.

From the foregoing description it is thought to be obvious that an inner tube constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

An inner tube provided substantially centrally of its sides with internal annular abutments and a continuous sheet of compressible material positioned within the tube for co-action with the tread portion of the tube, said sheet being initially of a fixed formation substantially in the form of a V with the side marginal portions of the sheet contacting with the abutments and the apex portion of the sheet disposed toward the central part of the tread portion of the tube, the side marginal portions of the sheet being concavo-convex in cross section with the convex face inwardly disposed, the side portions of the sheet when the tube is inflated being forced outwardly to cause said sheet to have snug contact at all portions with the tread portion of the tube between the abutments, said sheet when in the last named position under pressure within the tube being compressed within itself.

In testimony whereof I hereunto affix my signature.

THOMAS J. McCAFFREY.